United States Patent
Monfraix et al.

(10) Patent No.: US 9,971,559 B2
(45) Date of Patent: May 15, 2018

(54) INFORMATION SYSTEM COMPRISING A SCREEN AND CORRESPONDING COMPUTERS, COCKPIT AND AEROPLANE

(71) Applicant: AIRBUS OPERATIONS (SAS), Toulouse (FR)

(72) Inventors: Jean Monfraix, Leguevin (FR); Rui Fernandes Dos Santos, La Salvetat St Gilles (FR); Mathieu Collignon, Colomiers (FR); Arnaud D'Andrea, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 44 days.

(21) Appl. No.: 15/060,155

(22) Filed: Mar. 3, 2016

(65) Prior Publication Data

US 2016/0259612 A1 Sep. 8, 2016

(30) Foreign Application Priority Data

Mar. 5, 2015 (FR) ...................................... 15 51886

(51) Int. Cl.

| | |
|---|---|
| *G06F 3/14* | (2006.01) |
| *G06F 3/041* | (2006.01) |
| *H04L 29/08* | (2006.01) |
| *G01C 23/00* | (2006.01) |
| *G06F 3/0488* | (2013.01) |

(Continued)

(52) U.S. Cl.

CPC ........... *G06F 3/1423* (2013.01); *G01C 23/00* (2013.01); *G05D 1/0055* (2013.01); *G06F 3/0416* (2013.01); *G06F 3/0488* (2013.01); *G06F 3/1454* (2013.01); *G09G 5/006* (2013.01); *H04L 63/105* (2013.01); *H04L 67/12* (2013.01); *G09G 2370/16* (2013.01); *G09G 2380/12* (2013.01)

(58) Field of Classification Search
CPC ...... G06F 3/1423; G06F 3/0416; G06F 3/041; G06F 3/0488; G06F 3/1454; G06F 3/14; G09G 2380/12; G09G 2370/16
See application file for complete search history.

(56) References Cited

U.S. PATENT DOCUMENTS

| | | | | |
|---|---|---|---|---|
| 8,554,670 | B1 * | 10/2013 | Blank | ................... G06Q 50/01 705/1.1 |
| 2002/0158889 | A1 * | 10/2002 | Sameshima | ........... G06F 1/1601 345/636 |

(Continued)

*Primary Examiner* — Md Saiful A Siddiqui
(74) *Attorney, Agent, or Firm* — Greer, Burns & Crain, Ltd.

(57) ABSTRACT

An information system comprising a first computer and a second computer, a first display screen and a display management device connected to the first screen. Each computer communicates with the display management device by means of a communication network. The display management device allows control of the display of information from the first computer or from the second computer on the first display screen. A tactile unit is applied to the first display screen and an additional communication network, which is separate from the communication network between each computer and the display management device, allows the tactile unit to communicate with the second computer so that a user is easily able to act on the information displayed on the first screen without the risk of interference with the rest of the system.

10 Claims, 3 Drawing Sheets

(51) Int. Cl.
   *G05D 1/00*    (2006.01)
   *G09G 5/00*    (2006.01)
   *H04L 29/06*   (2006.01)

(56) References Cited

U.S. PATENT DOCUMENTS

| | | | | |
|---|---|---|---|---|
| 2003/0186745 | A1* | 10/2003 | Nguyen | G07F 17/32 |
| | | | | 463/42 |
| 2005/0221882 | A1* | 10/2005 | Nguyen | G07F 17/32 |
| | | | | 463/16 |
| 2006/0203133 | A1* | 9/2006 | Fujiwara | H04N 5/44513 |
| | | | | 348/744 |
| 2009/0096712 | A1* | 4/2009 | Ryu | G09G 5/005 |
| | | | | 345/1.3 |
| 2013/0307796 | A1* | 11/2013 | Liu | G06F 3/041 |
| | | | | 345/173 |
| 2014/0258880 | A1* | 9/2014 | Holm | H04L 65/40 |
| | | | | 715/748 |
| 2016/0162247 | A1* | 6/2016 | Bryczkowski | G06F 3/1446 |
| | | | | 345/1.3 |

* cited by examiner

INFORMATION SYSTEM COMPRISING A SCREEN AND CORRESPONDING COMPUTERS, COCKPIT AND AEROPLANE

RELATED APPLICATION

This application is entitled to and claims the benefit of French Application No. 1551886 filed Mar. 5, 2015, the disclosure of which, including the specification, claims, drawings and abstract, is incorporated herein by reference in its entirety.

BACKGROUND OF THE INVENTION

The present invention is generally concerned with information systems and more particularly with information systems for displaying on a screen information from a computer. The invention is in particular concerned with such information systems installed in aircraft cockpits.

In the aeronautical field, aircraft cockpits usually comprise a central display screen disposed between the pilot and the co-pilot. This display screen is controlled by a display management device that receives information to be displayed from the various computers. In the designates present application, generically onboard the term computer "computer" or computer server type units and personal computer type units.

In particular, the aircraft is provided with an onboard computer that transmits to the display management device information to be displayed relating to the aircraft, referred to as avionic information. This computer communicates with the display management device via a dedicated communication network referred to as an avionic network. This avionic network is referred to as protected in the sense that this network is certified and must not suffer interference.

The display management device also receives display information from another computer associated with the first pilot or the second pilot (also known as the copilot). A computer is usually associated with each pilot and transmits information to be displayed to the display management device. Each computer associated with a pilot is connected to a man-machine interface, of the mouse type, for example, enabling the pilot to control their computer.

The display management device controls the display on the screen of information coming from one of these computers.

However, when information, for example cartographic data, coming from the computer of one of the pilots is displayed on the central screen, the other pilot cannot act on the information displayed. Such limitation of action complicates the work of the pilots.

SUMMARY OF THE INVENTION

An object of the present invention is to propose a new information system enabling the pilots to control in a simple and flexible manner information displayed on the screen that comes from the computer of one of the pilots while limiting the risk of interference with the avionic network.

To this end, the invention comprises an information system including:
a first computer and a second computer each configured to generate information to be displayed;
a first display screen for displaying information from the first computer or information from the second computer;
a display management device connected to the first screen, the display management device being configured to control the display on the first screen of information from the first computer or of information from the second computer;
first communication network between the first computer and the display management device and a second communication network between the second computer and the display management device,
characterized in that the system includes a tactile unit applied to the first display screen and a third communication network between the tactile unit and the second computer; the third communication network being separate from the first communication network and the second communication network.

The use of a tactile unit applied to the screen combined with a dedicated communication network between the unit and the second computer provides a simple way for any user to act on the first screen to modify the information displayed when the latter comes from the second computer.

The tactile unit and the third network function independently of the first computer and the display management device and therefore with no risk of interference.

Moreover, the fact of applying a tactile unit to the first screen enables any user to use the first screen as an interface for operating on one of the computers without modifying the physical structure or software of the first screen.

In accordance with an advantageous feature, the display management device includes a display status indication module configured to transmit to the second computer the display status of its information and the second computer includes a control module configured to generate new information as a function of the display status and of information received from the tactile unit.

In accordance with one embodiment, the system includes a third computer for generating information to be displayed and a fourth communication network between the third computer and the display management device, said system including a fifth communication network between the third computer and the tactile unit.

In accordance with one particular aspect, the display status indication module is configured to transmit to the third computer the display status of its information and the third computer includes a control module configured to generate new information as a function of the display status and of information received from the tactile unit.

In accordance with another embodiment, the system includes a second display screen connected to the display management device and a second tactile unit applied to the second display screen, the system also including a sixth communication network between the second tactile unit and the second computer.

In accordance with another embodiment, the system includes a third display screen connected to the display management device and a third tactile unit applied to the third display screen and the system includes a seventh communication network between the third tactile unit and the third computer.

In accordance with one particular aspect, the display status indication module of the display management device is configured to transmit to each of the second and third computers the identification of the display screen or screens on which its information is displayed and the control module of each of the second and third computers is configured to generate new information as a function of information received from the associated tactile unit or units and the identification of the display screen or screens on which the information is displayed.

The or each of said communication network(s) between a tactile unit and a computer is preferably a wireless network.

The invention also concerns an aircraft cockpit equipped with an information system including computers, a screen and a display management device, characterized in that the information system is as described above.

The invention also concerns an aircraft including a cockpit, characterized in that the cockpit is as described above.

BRIEF DESCRIPTION OF THE DRAWINGS

The invention will be clearly understood on reading the following description of embodiments given with reference to the appended drawings in which.

DETAILED DESCRIPTION OF THE PREFERRED EMBODIMENTS

Figure 1:
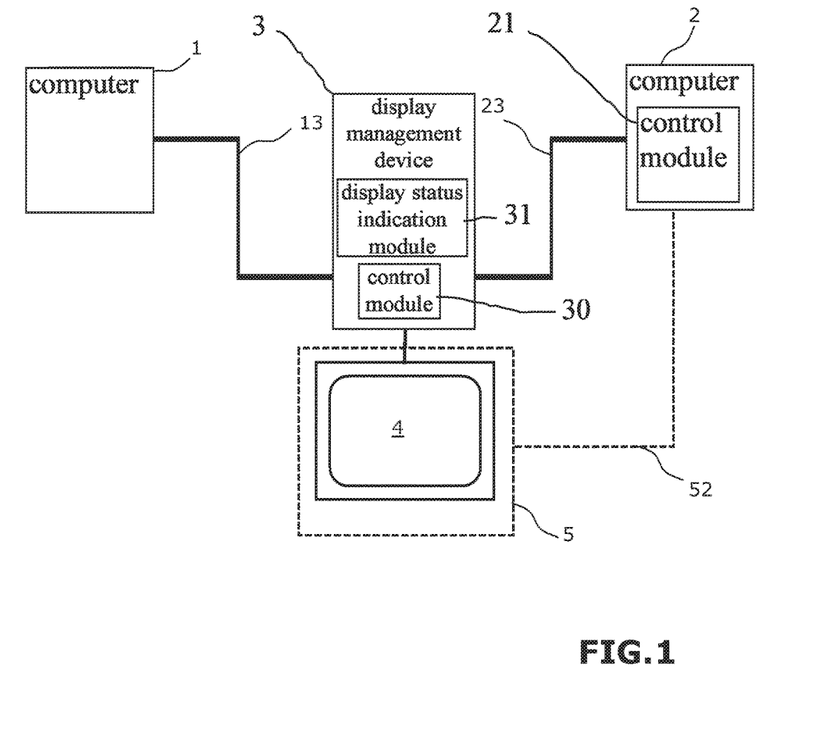
FIG. 1 is a diagrammatic view of an information system in accordance with a first embodiment of the invention including a screen fitted with a tactile unit and two computers.

In FIG. 1, there is represented an information system including a first computer 1, a second computer 2, and a first display screen 4. The first screen 4 is for displaying information generated by the first computer 1 or information generated by the second computer 2.

To this end the system also includes a display management device 3 connected to the screen 4. The display management device 3 is disposed between the computers 1, 2 and the screen 4. A first communication network 13 is established between the first computer 1 and the display management device 3. Similarly, a second communication network 23 is established between the second computer 2 and the display management device 3. The second communication network 23 is separate from the first network 13.

The display management device 3 can therefore receive via the corresponding network 13, 23 information from the first computer 1 and information from the second computer 2. The device includes a control module 30 for controlling the display on the screen either of information from the first computer 1 or of information from the second computer 2.

The system also includes a tactile unit 5 applied to the first display screen 4 and a third communication network 52 between the tactile unit 5 and the second computer 2. The third communication network 52 is separate from the first communication network 13 and the second communication network 23.

The display management device 3 also includes a display status indication module 31 for determining from which computer the information displayed comes. Thus, when the information displayed on the screen 4 is that coming from the computer 2 that is connected to the third network 52, the display status indication module 31 transmits to the computer 2 information indicating that the display status of its information is active.

This indication module 31 can be enabled to transmit to each computer from which information is displayed on the screen the corresponding display status information. The knowledge of this display status enables the computer to determine if its information is displayed on the screen 4 and, if its display status is active, to act on information that it receives from the tactile unit 5 to modify the information displayed.

The display management device 3, also known as a video concentrator, may be implemented in the form of an electronic processor and/or computer unit.

The computer 2 includes a control module 21 configured to generate new information as a function of information received from the tactile unit 5 if the display status of information from the computer 2 is active. When it is informed that its information is displayed on the screen 4, the computer 2 therefore knows that it can act on information from the tactile unit 5 because the information generated by that tactile unit 5 is the result of an action of a user linked to the information displayed by the screen 4. Conversely, if the display status is inactive, the computer 2 is not to act on information received from the tactile unit, because the information received from the tactile unit is not considered as linked to information from the computer 2. In this case, a computer that receives information from the tactile unit, but the information display status of which is inactive, does not act on the information received.

The first computer may be a computer generating data regarded as sensitive, for example avionic data, intended for the display management device 3. In accordance with one particular aspect the network 13 may be a network existing prior to the installation of the tactile unit 5 and that must not be modified, so as not to generate interference, and likewise its network 13.

In this case, the computer 1 has no means of communicating with the tactile unit 5. The operation of the tactile unit is then transparent for the operation of the computer 1, likewise for communication between the computer 1 and the display management device 3.

With no risk of interference with the computer 1 and the display management device 3, the tactile unit associated with the screen 4 therefore enables any user to act on the information displayed on the screen via the tactile unit 5 when the information displayed comes from the computer 2.

In accordance with one particular aspect, the tactile unit 5 converts detected gestures of the user into instructions for the control module 21 of the computer 2.

More generally, and regardless of the embodiment, the control instructions may be generated by the tactile unit on the basis of detected gestures or by the computer that communicates with the tactile unit if the unit merely transmits data corresponding to the detected gestures. The computer can then use its control module to generate new information to be displayed on the basis of said control instructions.

When this system equips the cockpit of an aircraft and the screen is disposed between the first pilot and the second pilot (also known as the co-pilot), the user of the screen 4 may equally well be the first or the second pilot, even if the computer 2 from which information is displayed is associated with the other pilot.

It is understood that a computer is associated with a given pilot in the sense that said computer has the benefit of a man-machine type control interface, for example a mouse, that is separate from the tactile unit and that is accessible only to said pilot.

In accordance with one particular aspect, the first communication network 13, also referred to as the avionic network, transmits to the display management device 3 information specific to the operation and piloting of the aircraft that is generated by the first computer 1.

The second computer 2 is the computer of the pilot or co-pilot that generates information such as cartographic information. It should be remembered that the second computer 2 is equipped with a man-machine interface, such as a mouse, that can be used by the corresponding pilot. The second network 23 enables transmission to the display management device 3 of information from said second computer 2, for example cartographic data.

As described in detail hereinafter, the communication network 52 is preferably a wireless network. The wireless network includes a wireless network card equipping the computer 2 and a wireless network card equipping the tactile unit 5. Said cards are configured to communicate with one another.

When the information system equips an aircraft cockpit, any user, pilot or co-pilot, can therefore act on the screen 4 via the tactile unit 5 to manipulate the information displayed with no risk of interference with the data transmitted from the computer 1 to the display management device 3 via the network 13.

In actual fact, information corresponding to gestures of users detected by the tactile unit 5 is transmitted via the third network 52 to the computer 2. The computer 2 can then use the control module 21 to modify the information to be displayed and transmit it to the display management device 3.

Figure 2:
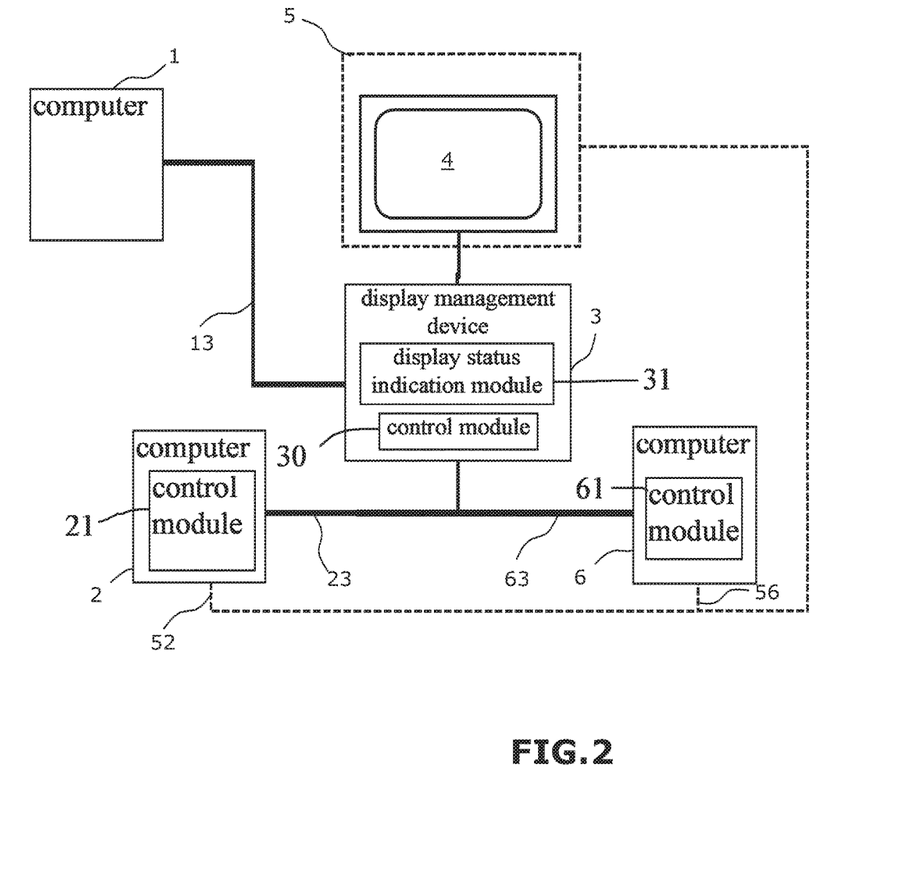
FIG. 2 is a diagrammatic view of an information system in accordance with a second embodiment of the invention including a screen fitted with a tactile unit and three computers.

FIG. 2 shows a second embodiment of the information system that again includes the elements of the first embodiment shown in FIG. 1, namely the computers 1, 2, the display management device 3, the screen 4 fitted with the tactile unit 5 and the corresponding communication networks 13, 23, 52.

To those elements is added a third computer 6 configured to generate information to be displayed and adapted to communicate with the management device 3 via a communication network 63. The communication networks 23 and 63 between the management device 3 and the computers 2, 6 may be shared or separate.

The control module 3 o of the management device 3 is configured to control the display on the screen of information from the first computer 1 or of information from the second computer 2 or of information from the third computer 6.

The tactile unit 5 is configured to communicate with the computer 6 via a communication network 56 separate from the communication network 63. This communication network 56 may be shared with the communication network 52. In this case, each of the computers 2, 6 includes a network card for receiving information from the tactile unit 5 and the tactile unit includes a network card configured to transmit information to the corresponding network cards of the computes 2, 6. If the communication network 56 is separate from the communication network 52, the tactile unit 5 includes a network card configured to communicate with the computer 2 and a separate network card configured to communicate with the computer 6.

In a similar manner to the second computer 2, the third computer 6 is advantageously equipped with a man-machine interface, such as a mouse, that the corresponding pilot can use.

The display status indication module 31 of the management device 3, like the computer 2, enables indication to the computer 6 of the active or inactive display status of information from the computer 6. The computer 6 also includes a control module 61 configured to generate and to transmit to the display management device 3 new information as a function of information received from the tactile unit 5 when the display status of the information from the computer 6 is active.

The computer 6 that receives information from the tactile unit 5 can therefore, when the display status of its information is active, act on information from the tactile unit 5 because such received information is indeed the result of interaction of the user, via the tactile unit, with information from the computer 6 displayed on the screen.

Conversely, if the display status for the computer 6 is inactive, the computer 6 should not act on information received from the tactile unit 5, because the information from the tactile unit does not concern the information generated by the computer 6 but may be the result of an involuntary touching of or unintentional tactile control input to the computer 6, for example when the information display comes from the computer 1. The information transmitted by the tactile unit 5 may also correspond to information from the computer 2 so that the computer 6 does not have to act on it, even if it receives it.

If the computer 2 is associated with a first pilot and the computer 6 is associated with a second pilot, the screen 4 being disposed between the two pilots, each of the pilots can, via the tactile unit 5, act on the information displayed on the screen that comes from their computer or from the computer of the other pilot, with no risk of interference with the computer 1, the network 13 or the display management device 3. In actual fact, the management device 3 continues to receive information from the computers 2, 6. It is at the level of these computers 2, 6 that the information intended to be transmitted to the display management device 3 is modified, if necessary, as a function of information transmitted by the unit 5.

Figure 3:
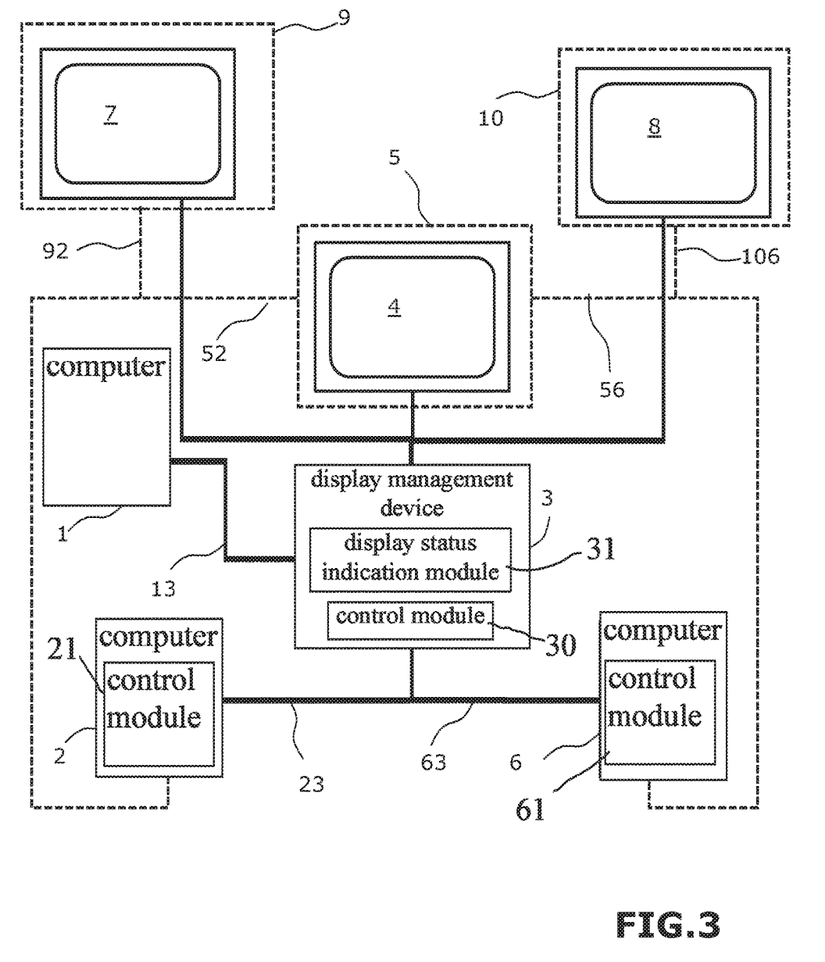
FIG. 3 is a diagrammatic view of an information system in accordance with a third embodiment of the invention including three screens each fitted with a tactile unit and three computers.

FIG. 3 shows a third embodiment of the information system that again includes the elements of the second embodiment shown in FIG. 1, namely the computers 1, 2, 6, the display management device 3, the screen 4 fitted with the tactile unit 5, and the corresponding communication networks 13, 23, 63, 52.

In the example shown in FIG. 3 the networks 52 and 56 that enable the tactile unit 5 to communicate with the computer 2 and the computer 6, respectively, are separate. The tactile unit 5 includes a network card (not shown) intended to communicate with a network card (not shown) of the computer 2 to form the network 52 and another network card (not shown) intended to communicate with a network card (not shown) of the computer 6 to form the network 56. Alternatively, said networks 52 and 56 may be shared, as explained in the case of the previous embodiment shown in FIG. 2.

The information system shown in FIG. 3 further includes a screen 7 fitted with a tactile unit 9 and a screen 8 fitted with a tactile unit 10. The information system also includes a communication network 92 enabling the tactile unit 9 to transmit to the computer 2 information resulting from gestures of a user on the screen 7. The system also includes a communication network 106 enabling the tactile unit 10 to transmit to the computer 6 information resulting from gestures of a user on the screen 8. Each communication network 92, 106 includes a network card (not shown) with which the tactile unit 9, 10 is equipped and a network card (not shown) with which the computer 2, 6 with which the tactile unit is intended to communicate is equipped.

The display status indication module 31 of the display management device 3 is configured to transmit to each computer 2, 6 the display status of its information and, if the display status is active, the corresponding display screen is also indicated to the corresponding computer. To this end, the display management device 3 uses a communication protocol making it possible to identify the display screens and the computers from which information is displayed on the corresponding screens.

In other words, the system includes an associated display screen 7, 8 for each computer 2, 6 in addition to the central screen 4. Each tactile unit that equips a screen is able to communicate with the corresponding computer.

The computer 2 can therefore receive information from the tactile unit 9 and from the tactile unit 5 for modifying the information displayed on the screen 7 and on the screen 4 when said information displayed is from the computer 2. Similarly, the computer 6 can receive information from the tactile unit 10 and from the tactile unit 5 to modify the information displayed on the screen 8 and on the screen 4 when the displayed information is from the computer 6. To this end, the modules 21, respectively 61, of the computers 2 and 6 make it possible to generate new information to be displayed on the screens 7, respectively 8, and also on the screen 5 if the display status corresponding to the computer is active.

Any user, pilot or co-pilot, can therefore act on the central screen 4 or on their own or that of the other pilot via the corresponding tactile unit 5, 9, 10 to manipulate the information displayed with no risk of interfering with the computer 1 that generates avionic data, for example, or its network 13. In actual fact, the information corresponding to the detected gestures on a screen are transmitted by the corresponding tactile unit to the associated computer from which the displayed images come, in a manner that is transparent for the rest of the system.

In any of the embodiments described above, the communication network between the, one or each tactile unit and the computer or computers with which it or they are intended to communicate is preferably a wireless local area network. In accordance with one particular aspect, the wireless local area network is a network using the Bluetooth (registered trademark) communication standard. To reduce the risks of piracy, the Bluetooth communication standard used may be the class 3 Bluetooth standard notably defined in the IEEE 802.15 standard, that has a range of the order of one meter.

In accordance with one particular aspect, the various Bluetooth networks used may be distinguished from one another by their Bluetooth address. The process of establishing a Bluetooth network between a tactile unit and a computer may be effected in accordance with the Service Discovery Protocol (SDP) notably defined in the IEEE 802.15 standard. Communication between the tactile unit and the computer may conform to the Radio Frequency Communication (RFCOMM) protocol) defined in the ETSI TS 07.10 standard.

The technology used for the tactile function of the tactile unit may include an interface provided with a plurality of emitters forming a matrix of beams and a plurality of receivers to detect beam interruption and to deduce therefrom the position relative to the screen of a pointing element (for example, a finger or a stylus). The location of the break in the light beams determines the coordinates of the interaction. Alternatively, the tactile function may comprise a video camera and a processing unit configured to identify the position and/or the movement of the pointing element relative to the screen. The tactile unit may also include an interface formed of a transparent touch-sensitive sheet placed over the screen.

The tactile unit also includes a module for generating information as a function of detected gestures. The network card or cards with which the tactile unit is equipped enables this information to be transmitted to the corresponding computer or computers. The gestures detected are, for example, tapping or touching, double tapping or sliding. As mentioned above, following gesture detection by a tactile unit, corresponding control instructions may be generated either by the tactile unit and transmitted to the corresponding computer or by the corresponding computer if the tactile unit transmits the detected gesture information to said computer.

In the various embodiments described above, the tactile unit applied to the display screen or to each display screen enables a user, who may be the first pilot or the second pilot of an aircraft, to act on the display screen and thus to transmit instructions relating to the displayed information to the corresponding computer from which that information comes, in a simple manner and without having to modify the physical structure and/or software of the display screen.

The various embodiments described above provide an easy way to render tactile a display screen of an aircraft that was not initially equipped with a tactile screen without generating interference with modifications risking creation of the protected networks of that aircraft. Implementing the system necessitates little modification and it is not necessary to modify the preexisting networks. In actual fact, the or each tactile unit is added to the corresponding screen and supplied with electrical power and the communication network created between said unit and one or more computers of the system is separate from the networks between the computers and the display management device. Using a wireless network moreover makes it possible to avoid additional wiring operations.

The person skilled in the art will readily understand that the various functions of the embodiments described above may be implemented in the form of computer programs.

Those computer programs or computer instructions may be contained in program storage devices, for example computer-readable digital data storage media, or executable programs. The programs or instructions may also be executed from program storage peripherals.

Embodiments of the invention have been illustrated and described. It should be noted that other modifications, substitutions and alternatives will occur to the person skilled in the art and may be changed without departing from the scope of the subject matter described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An information system comprising:
    a first computer and a second computer each configured to generate information to be displayed;
    a first display screen for displaying information from the first computer or information from the second computer;

a display management device connected to the first screen, the display management device being configured to control, on the first display screen, the display of information from the first computer or of information from the second computer;

a first communication network between the first computer and the display management device and a second communication network between the second computer and the display management device, a tactile unit applied to the first display screen, a third communication network between the tactile unit and the second computer, the third communication network being separate from the first communication network and the second communication network, and the third communication network being configured to allow for communication directly between the tactile unit and the second computer without including the display management device, and wherein the tactile unit converts detected gestures into instructions which the second computer uses to generate new information for the first display screen only when the first display screen is displaying information from the second computer.

2. The system according to claim 1, wherein said display management device is configured to transmit to said second computer the display status of its information, and wherein said second computer is configured to generate the new information as a function of said display status and of the instructions received from the tactile unit.

3. The system according to claim 2, wherein the system includes a third computer configured to generate information to be displayed and a fourth communication network between the third computer and the display management device, said system including a fifth communication network between the third computer and the tactile unit, and wherein the tactile unit converts detected gestures into instructions which the third computer uses to generate new information for the first display screen only when the first display screen is displaying information from the third computer.

4. The system according to claim 3, wherein said display management device is configured to transmit to said third computer the display status of its information, and wherein said third computer is configured to generate the new information as a function of said display status and of the instructions received from the tactile unit.

5. The system according to claim 3, wherein the system includes a second display screen connected to the display management device and a second tactile unit applied to the second display screen, and wherein the system also includes a sixth communication network between the second tactile unit and the second computer, and wherein the second tactile unit converts detected gestures into instructions which one of the second computer or the third computer uses to generated new information for the second display screen only when the second display screen is displayed information from the one of second computer or the third computer.

6. The system according to claim 5, wherein the system includes a third display screen connected to the display management device and a third tactile unit applied to the third display screen, and wherein the system includes a seventh communication network between the third tactile unit and the third computer, and wherein the third tactile unit converts detected gestures into instructions which one of the second computer or the third computer uses to generated new information for the third display screen only when the third display screen is displaying information from the one of the second computer or the third computer.

7. The system according to claim 5, wherein said display management device is configured to transmit to each of the second and third computers the identification of the display screen or screens on which its information is displayed, and wherein each of the second and third computers is configured to generate the new information as a function of the instructions received from the associated tactile unit or units and the identification of the display screen or screens on which the information is displayed.

8. The system according to claim 1, wherein said or each of said communication network(s) between a tactile unit and a computer is a wireless network.

9. An aircraft cockpit comprising:
an information system including computers,
a screen and
a display management device,
the information system comprising:
a first computer and a second computer each configured to generate information to be displayed;
a first display screen for displaying information from the first computer or information from the second computer;
a display management device connected to the first screen, the display management device being configured to control, on the first display screen, the display on the first screen of information from the first computer or of information from the second computer;
a first communication network between the first computer and the display management device and a second communication network between the second computer and the display management device,
a tactile unit applied to the first display screen,
a third communication network between the tactile unit and the second computer, the third communication network being separate from the first communication network and the second communication network, and the third communication network being configured to allow for communication directly between the tactile unit and the second computer without including the display management device, and wherein the tactile unit converts detected gestures into instructions which the second computer uses to generate new information for the first display screen only when the first display screen is displaying information from the second computer.

10. An aircraft comprising:
a cockpit comprising:
an information system including computers,
a screen and
a display management device,
the information system comprising:
a first computer and a second computer each configured to generate information to be displayed;
a first display screen for displaying information from the first computer or information from the second computer;
a display management device connected to the first screen, the display management device being configured to control, on the first display screen, the display on the first screen of information from the first computer or of information from the second computer;

a first communication network between the first computer and the display management device and a second communication network between the second computer and the display management device,
a tactile unit applied to the first display screen,
a third communication network between the tactile unit and the second computer, the third communication network being separate from the first communication network and the second communication network, and the third communication network being configured to allow for communication directly between the tactile unit and the second computer without including the display management device, and wherein the tactile unit converts detected gestures into instructions which the second computer uses to generate new information for the first display screen only when the first display screen is displaying information from the second computer.

* * * * *